C. A. RITTMAN.
CRAYON MACHINE.
APPLICATION FILED MAY 4, 1912.
1,112,229.
Patented Sept. 29, 1914.
4 SHEETS—SHEET 1.
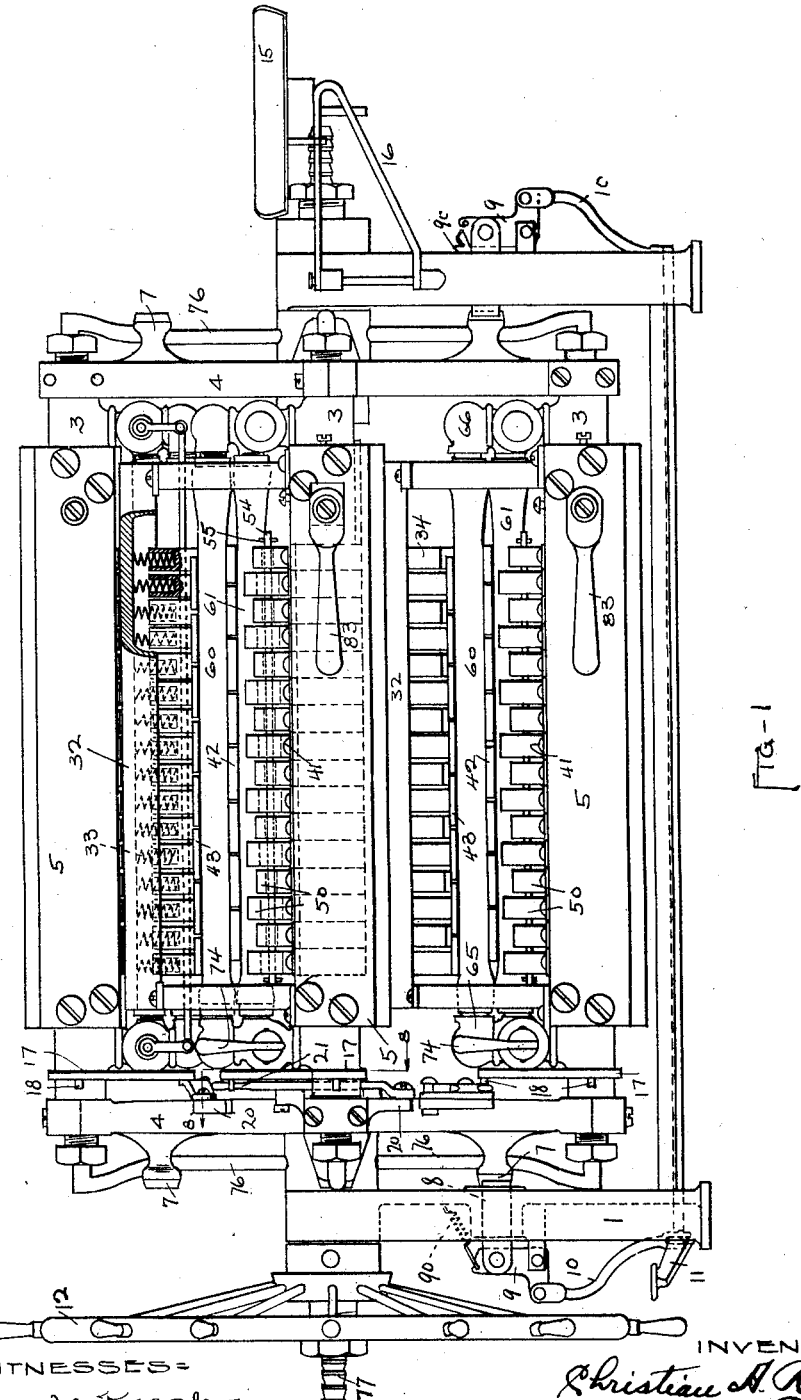
WITNESSES:
Oliver M. Kappler.
Horace B. Fay.
INVENTOR
Christian A. Rittman
BY J. B. Fay
ATTORNEY

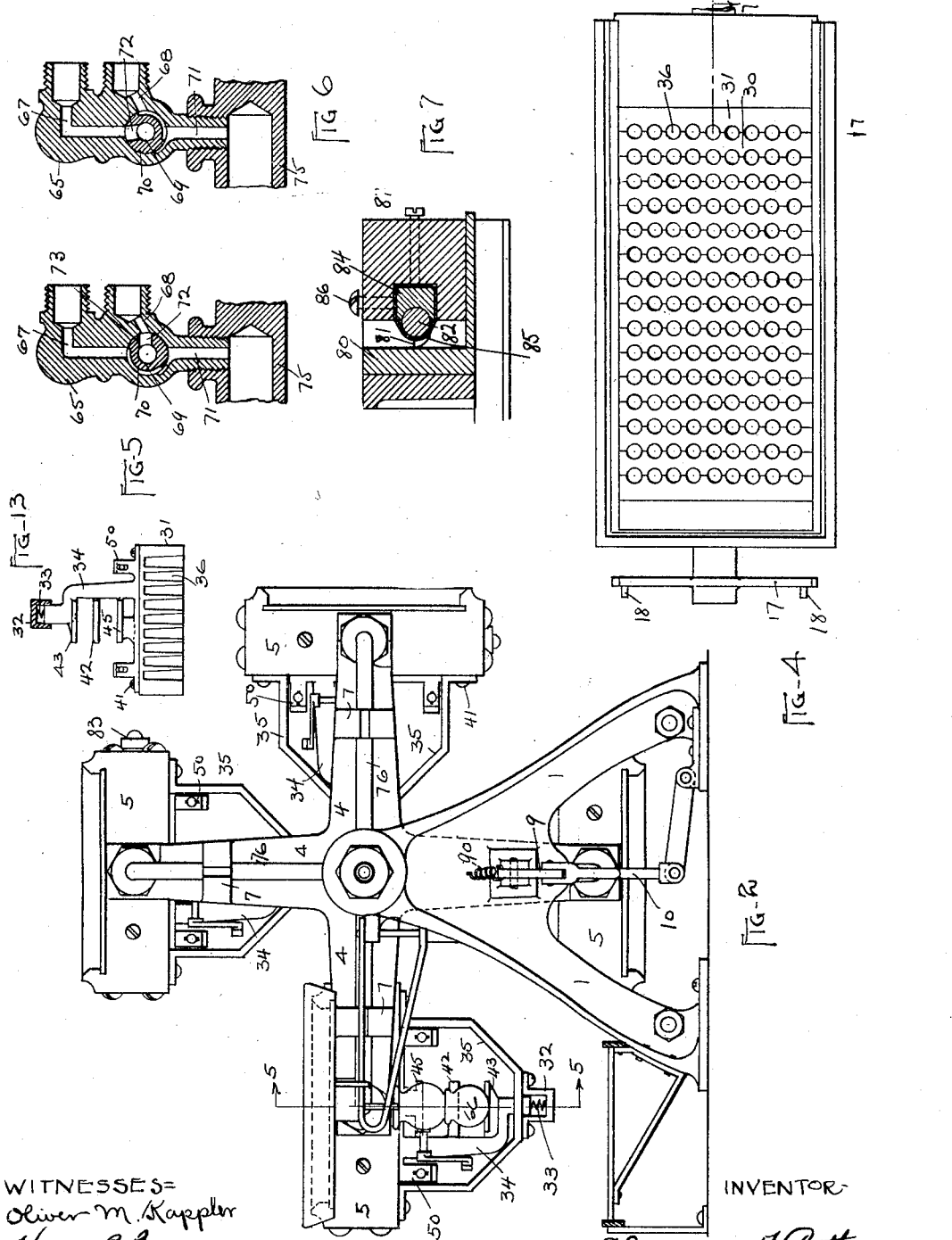

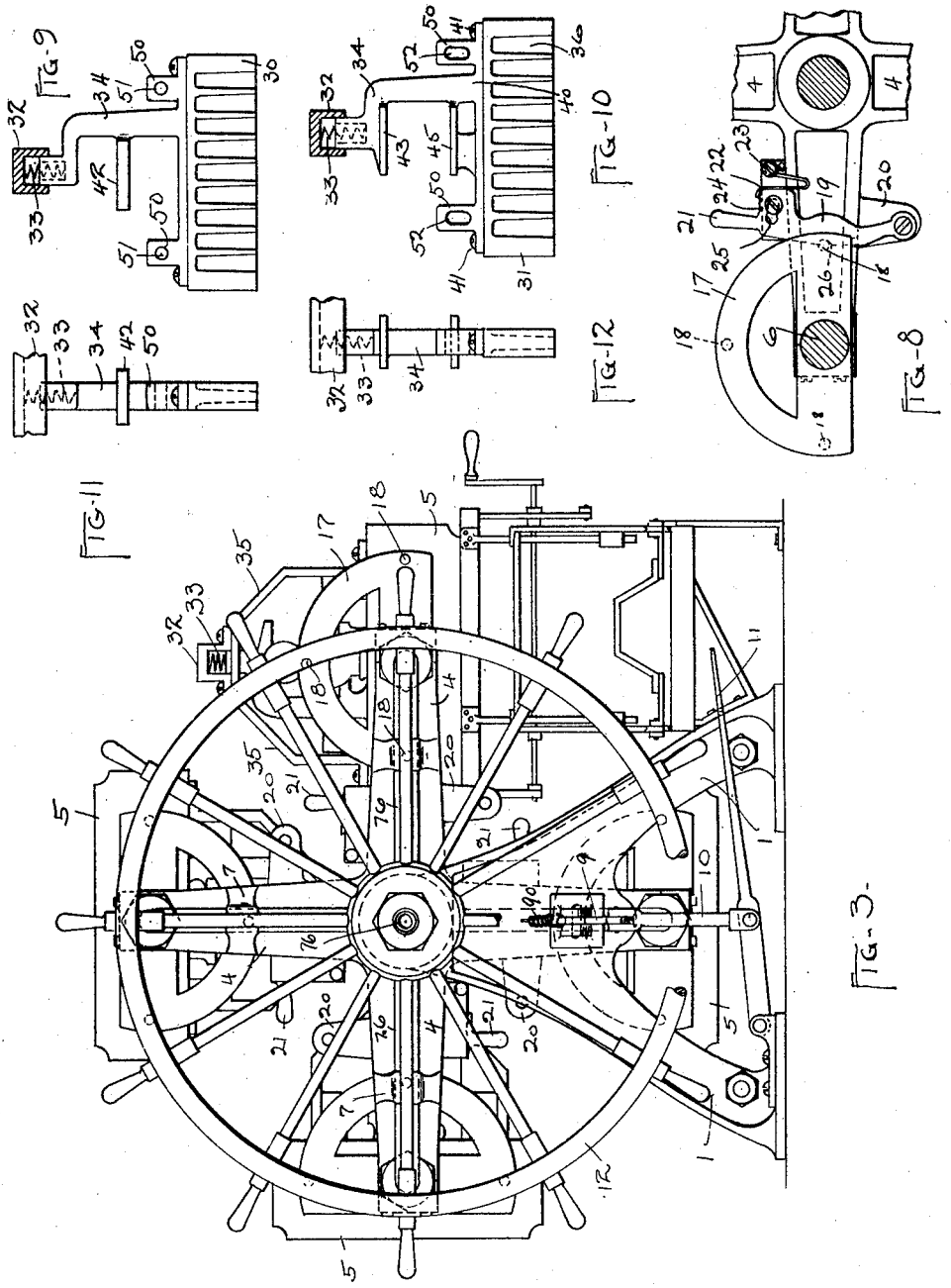

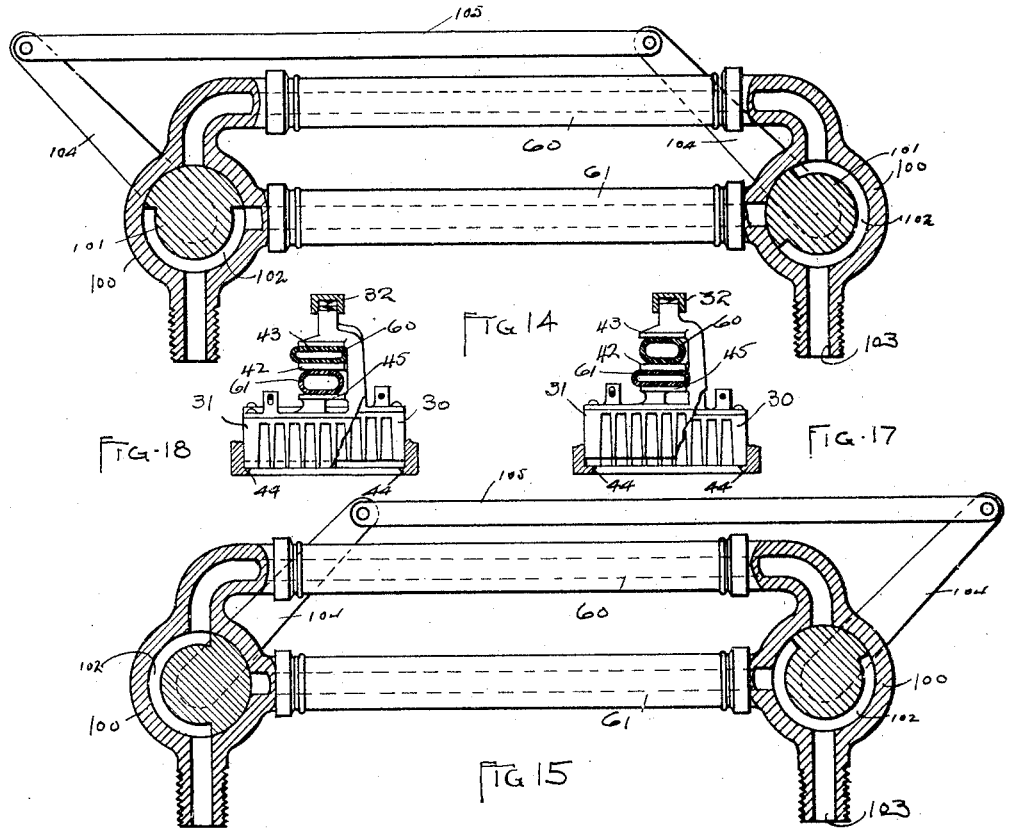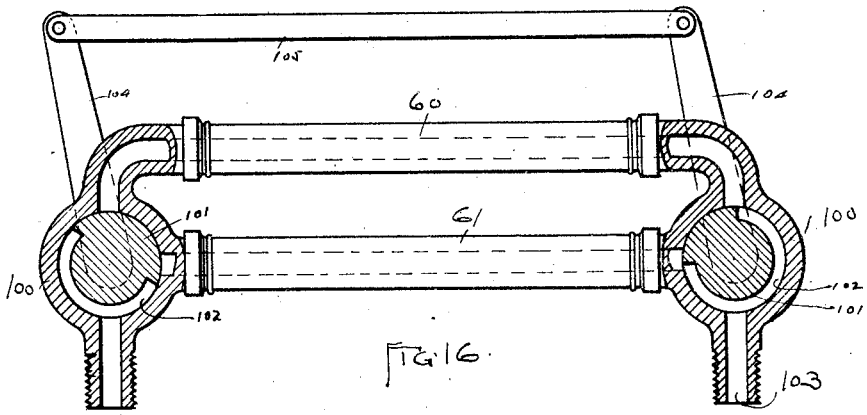

UNITED STATES PATENT OFFICE.

CHRISTIAN A. RITTMAN, OF SANDUSKY, OHIO, ASSIGNOR TO THE AMERICAN CRAYON COMPANY, OF SANDUSKY, OHIO, A CORPORATION OF OHIO.

CRAYON-MACHINE.

1,112,229.  Specification of Letters Patent.  Patented Sept. 29, 1914.

Application filed May 4, 1912. Serial No. 695,096.

*To all whom it may concern:*

Be it known that I, CHRISTIAN A. RITTMAN, a citizen of the United States, and a resident of Sandusky, county of Erie, and State of Ohio, have invented a new and useful Improvement in Crayon-Machines, of which the following is a specification, the principle of the invention being herein explained and the best mode in which I have contemplated applying that principle, so as to distinguish it from other inventions.

My invention relates to a machine for the manufacture of crayons, chalk and like materials, and is an improvement on the type of machine which was first shown in its general features in Patent No. 437,751, to Cowdery, and later improved as shown in Patent No. 476,038, to Cowdery et al., and in Patent No. 476,051 to Liedke. The statement that the present machine is similar to those shown in the foregoing patents is true only in a more general sense, since the arrangement of the various mold tables is somewhat similar to that shown in these patents, although the means for actuating the mold plates held in the tables to discharge the molded material is entirely different and superior to the means heretofore used.

The present machine is designed to permit of an extremely rapid operation of the mold plates in thus discharging the molded material and the means shown for this purpose are adapted to save a considerable amount of time in such discharge over any of the prior machines of this type. The increased speed is due, to some extent, to the positve return of the mold plates after displacement, and also to the use of fluid-pressure displacing or reciprocating means, which are very well adapted to the present operation although mechanical means may be substituted, if designed to serve the same functions.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of the various mechanical forms in which the principle of the invention may be used.

In said annexed drawings:—Figure 1 is a side elevation of my machine; Fig. 2 is an end elevation of the same looking from the right of Fig. 1; Fig. 3 is an end elevation looking from the left of Fig. 1; Fig. 4 is a plan view of one of the mold tables; Figs. 5 and 6 are sectional views on the line 5—5 in Fig. 2, showing the valve in each of its two operative positions; Fig. 7 is a sectional view on the line 7—7 in Fig. 4; Fig. 8 is a section on the line 8—8 in Fig. 1, showing only one of the four arms of the machine; Fig. 9 is a side elevation of one of the mold plates; Fig. 10 is a similar view of a complementary mold plate which is adapted to be placed laterally adjacent to the mold plate in Fig. 9; Figs. 11 and 12 are front elevations of the mold plates shown in Figs. 9 and 10 respectively; Fig. 13 is a side elevation of two complementary molds showing them in their inoperative or normal relation; Figs. 14, 15 and 16 are more or less diagrammatic views of valve mechanism adapted to be used in my machine under conditions to be described hereinafter; and Figs. 17 and 18 are views similar to Fig. 13, showing the plates when operated.

In machines of the present type, it is necessary to fill the molds with crayon material which is in a damp state. Some few minutes are required for this material to dry and harden before the crayons can be removed, and it is, therefore, desirable to provide a plurality of mold frames which can be filled in turn, the number being calculated so that as the last is filled, the first will contain crayons sufficiently dry to discharge. The number of mold frames is governed by the time required by the material to set, and the number of individual molds in each frame is limited merely by the time required to fill them and by the desired weight of the frame.

From an inspection of Figs. 1, 2 and 3, it will be seen that the general construction of the present machine is somewhat similar to that of the machine shown in the patents cited in the preceding paragraphs. There is a frame consisting of upwardly extending legs 1, upon which there is mounted a reel comprising a shaft 3 and a series of arms 4 at either end of the same, said arms being similarly disposed. These arms are four in number and are equally spaced about such shaft. At the extremities of each pair of corresponding arms there is rotatably mounted a mold table or frame 5 upon a shaft 6 borne by the corresponding arms.

Upon each arm there is mounted a latch 7 which is adapted to be engaged by a member 8 which is slidably mounted in the body of the frame and is pivotally attached to a bell-crank 9 also mounted in the frame and actuated by means of a rod 10 and a treadle 11. A spring 90 is attached to the frame and to the bell-crank 9 and retains the member 8 in engagement with the latch 7. Upon the end of the main shaft 3 there is attached a hand wheel 12, and by means of this wheel an operator may rotate the shaft 3 and with it the mold tables or frames, upon first releasing the latch 7 by operating the treadle 11. The mold frames will, of course, be of equal size and substantially the same weight, so that it is a simple matter to rotate the same when the latch has been released.

At the right side of the machine there is mounted a tray 15, which is held upon a bracket 16 rotatably mounted upon one of the arms of the frame. This bracket is adapted to register with the end of the mold table when the latter has been brought to a stationary position on the same side of the frame and midway between the lower and upper positions. Upon each arm there is mounted a semi-circular guide 17, having three pins 18 mounted at equal intervals thereon, and adapted to be engaged by a locking member 19 pivotally mounted upon an extension 20 from the arm. A handle 21 permits of operation of this locking member which is normally held in the position shown in Fig. 8 by means of a spring 22 attached to a pin 23 on this arm. A second pin 24 slidably engages a slot 25 in the locking member for the purpose of guiding the same in its movement. The guide 17 will be attached to the end of the mold frame and the latter will thus be locked in any desired position by means of the pins 18 and the locking member 19 which has a recess 26 adapted to engage a pin when the locking member is in the position in Fig. 8.

By means of the guide and locking member, the mold frame may be secured in any one of three positions. The frame at the right in Fig. 3, is in position to discharge. The other frames in that figure, are in their inoperative position, and the frame at the left of Fig. 2 is ready to be filled.

It will be seen that the mold frame or table comprises a rectangular box, open at the top and bottom, which will have shoulders 44, at the inside near the bottom, adapted to receive and support the mold plates 30 and 31. Only two of these mold plates will be described, but the construction and operation of all will be similar to these two. These mold plates will be placed transversely in the frame and will be slidable up and down therein, the lower limit of such movement being the position of the shoulders, and the upper limit being the position designed by guide members 32 which have springs 33 interposed between them, and the upper part of the arms 34 extending from the mold plates proper. The guide member 32 will be supported by rods 35 attached to the sides of the mold frame.

The construction of the mold plates is similar to those in such common use in that they are fractional and complementary, each mold plate having recesses on its lateral faces. Any two adjacent plates are adapted to conjointly form open molds 36, which will be filled with the material to be molded. The usual method of discharging the molded material after the same has set in these molds is by jarring the plates or moving the same relatively to each other either by pivotal or reciprocable movement, so that the molded material is forced away from first one-half of the mold and then the other. Various types of mechanical means have been designed for this purpose, such as cams, rocking shafts where the mold plates are pivotal, and similar means.

In the present construction a plate 40 is removably attached by means of pins 41 to the top of the mold plate proper, and this plate will have an upwardly extending arm 34, as shown in Figs. 9 and 10. It is not essential that these plates extend upwardly as they may equally well be disposed on the ends of the molds, in which case, the guides 32 will be similarly disposed. Such a construction will be more expensive than the one illustrated, but will be very compact and will not add to the weight. As has been already stated, each two adjacent plates are complementary and together form one series of molds. The alternately disposed plates in the series will be of one construction, and those between the same of a slightly different construction in order to permit of movement of first one set and then the other. The mold plate 30 has a lug 42 projecting laterally from the arm 34 intermediate the extremities of the same. The complementary mold plate 31, is provided with an upper lug 43 and a lower lug 45 attached to the arm 34. When these two plates are disposed adjacent to one another upon an even surface, (see Fig. 13), such as the shoulder of the mold frame, the lugs 42 will be placed intermediate of the lugs 45 and 43 on the mold 31. The construction of the lugs is shown best in Figs. 11 and 12, and it can be seen that they are much wider than are the plates themselves, so that the alternately disposed lugs form substantially a continuous wall throughout the length of the mold frame.

It has been already stated that the alternately disposed molds are adapted to be reciprocated relatively to the other molds, first one series of molds moving, and then the other. It is desirable to give the molds a sharp blow when the moving mold reaches the limit of its stroke, and for this purpose on the mold 30 there are placed upstanding lugs 50 which have apertures 51 which are substantially circular in form, but are slightly wider vertically than horizontally. Upon the mold member 31 there are placed similar lugs 50 which have slots 52 which are adapted to register with the apertures 51 on the plates 30. A rod 54 is inserted in the slots 52 and the apertures 51, and is held in such position by means of keys 55 passing through the ends of the same. As the mold members 31 are raised vertically, the lower side of the slot 52 will strike the rod 54 when the plate is near the end of its movement, and will thus move the same against the upper side of the apertures 51 in the members 30. These apertures are almost circular, and there will be very little play for the rod between the sides of the same, but there is sufficient for this action to slightly jar the members upon the completion of the upward stroke of the members 31.

For reciprocating the mold plates, I provide fluid-operated means which include two flexible conduits 60 and 61, the conduit 60 being disposed between the lug 43 on the plate 31 and the lug 42 on the plate 30. The conduit 61 will be placed between the lower side of the lug 42 and the lug 45 on the member 31. It will be understood that the reciprocation of the mold plates will be secured by the alternate operation of these conduits as will be hereinafter described.

My machine is designed to be operated by any suitable fluid, and the only distinction made between different fluids will be as to whether they are to exhaust into the atmosphere or into a conduit or drain connected to the machine. Air may be discharged directly, while steam and water will be led away to a condenser and a drain respectively. The valve shown in Figs. 5 and 6 is adapted for air, and that shown in Figs. 14, 15 and 16, for steam or water. When used with air, but one end of each tube is open, the fluid being admitted and discharged by a single valve such as that shown in Figs. 5 and 6.

At one end the conduits 60 and 61 will be connected to a valve casing 65, having passages 67 and 68 leading to the conduits 60 and 61 respectively, and controlled by means of a rotary stopper 69 which, upon one side, will have a groove 70 adapted to connect the passage 67 with the inlet passage 71, and the port 72 adapted to connect the passage 68 with the hollow interior passage 73 in such stopper. It will be understood that the groove 70 will be adapted to also connect up passage 68 with the inlet passage 71 upon being rotated, when the port 72 will connect with the passage 67. Rotation of this stopper is controlled by means of a handle 74 mounted upon the outside of the valve casing. The interior passage 73 in the stopper will be connected with the atmosphere thus permitting the fluid in the member 60 and 61 to discharge directly. To discharge both conduits the valve is moved into each of its discharging positions and then placed in a half-way position, keeping both inlets closed.

Upon the lower end of the valve member there is attached by means of threading, a tube 75 which will pass through the arm, where it will connect up with a second tube 76 leading to the hollow interior of the shaft 3 which will be connected up by means of a nipple 77 with any suitable source of fluid pressure. In the present construction, however, I have shown two valve members, one at either end of the conduits, which are adapted to not only let the fluid into the conduits, but also to permit of discharge of the same, the fluid in this case being preferably water under a pressure of from 50 to 65 pounds, such as can be obtained from the city mains. A suitable valve mechanism is shown in Figs. 14, 15 and 16.

Referring to Figs. 14, 15 and 16, it will be seen that two valve casings 100 are shown, one at either end of the conduits 60 and 61. These figures are diagrammatic in character and are intended to illustrate the construction of the valve only. A stopper 101 is placed in each casing and will have a single groove or passage 102 extending substantially three-fourths of the way around the stopper. In Fig. 14, the valve is in position to deliver fluid to the lower conduit 61, the upper conduit discharging through the valve at the right side into the pipe 103. The two valves are simultaneously operated by the handles 104, and the connecting rod 105, and the valves are so timed that, except in one position, fluid is being admitted to one conduit and being discharged from the other. When being filled, the mold plates must be on the same level in order to form the proper molds, and therefore the fluid must be discharged from both tubes. For this operation the valves will be turned into the positions shown in Fig. 16.

When the mold frame is in position to discharge the molds, which is the position of the mold frame shown at the right hand side of Fig. 3, the operator will open the valve leading to the conduit 60, thus permitting the fluid to enter the same. This conduit, which is flexible, will normally be flattened to a considerable extent, and entrance of the fluid will expand the same on its upper and lower sides (see Fig. 17). The lower side of this conduit is in contact with the upper side of the lugs 42, and the upper side of the conduit is in contact with the lower side of the lugs 43. Expansion of the conduit will, therefore, exert a downward pressure on the lugs 42, and accordingly on the mold plates 30, and an upward pressure on the lugs 43 and on the mold plates 31. The mold plates 30 are already in their lowest position, the bottom of the same resting upon the shoulders in the mold frame, and the expansion of the conduit will cause a rapid upward movement of the mold plates 31, thus moving the fractional mold forms in this plate relatively to the fractional mold forms upon the plate 30. The limit of such upward movement is, of course, the position of the guide 32. The entrance of the fluid and the expansion of the conduit will, of course, be almost instantaneous, and upon opening the valve, the operator will at once close the same, thus permitting of the discharge of the fluid in such upper conduits 60 and permitting the entrance of fluid to the lower conduit 61. The upper side of this conduit is in contact with the lower side of the lugs 42, and the lower side of the conduit is in contact with the lugs 45. This conduit will, of course, be normally flattened in the same way as the conduit 60, and the entrance of this fluid will expand the same, causing a pressure upward on the mold 30 through the lug 42, and a downward pressure on the mold 31 through the lug 45 (see Fig. 18). Such action by conduit 61 causes the conduit 60 to be compressed between lugs 42 and 43, thus expelling all the fluid. The member 31 will at this instant be slightly raised, due to the action of the fluid in the conduit 60, and the expansion in the conduit 61 will force the mold 31 on to its seat in the projection on the mold frame and will exert pressure upward on the molds 30 through the lugs 42. This will cause a movement of the molds 30 relative to the molds 31, and by means of the action of the rod 54 in the apertures 51 and the slots 52, a sharp blow will be struck upon the plates tending to force the material from out of the mold forms. The valve will preferably be moved into each of its two positions twice, thus reciprocating each mold plate the same number of times, which will be sufficient to discharge all of the mold material from the mold forms.

The mold plates are placed side by side in the open mold frame, and the repeated movement of the same against each other will tend to cause wear and looseness. I provide for the taking up of such wear by means of an angle iron 80, which rests upon the shoulders of the mold frame and is forced against the adjacent mold member, thus forcing all of the mold members together by means of a cam 81 mounted upon a shaft 82 and operated by means of a handle 83 mounted exteriorly of the mold frame. This shaft 82 is held in a block 84 by means of strap irons 85, and this block may be adjusted vertically and laterally to take up wear by means of screws 86 and 87 respectively. The means for adjusting the mold plates also serves to clamp the same together when filled. Such clamping action and the pressure of the springs 33, retain the mold plates in their inoperative position while the material is hardening in the molds. The springs 33, and of course the lugs 50 and rod 54, serve to limit movement of the mold plates while the springs assist the flexible conduits to return the mold plates to position after they have been raised.

The operation of my machine is brought out sufficiently by the description of the action of the mold plates. The means for clamping a receiver for the molded crayons against the mold frame is shown but not described, since it forms no part of the present invention. It will consist of a carriage having a vertically movable frame, and may be of any desired construction. The features of my invention which I call particular attention to, are the means for positively seating the mold plates, the means for jarring the same, and the use of fluid pressure to operate. The first two features give an extremely efficient discharge, and the last-named feature cuts down the labor and gives a considerably increased speed. In cam-operated machines, the operator is forced to turn the shaft driving the cams. This is not only extremely hard work but necessarily very slow. By eliminating this labor and by providing a very rapid operating discharge, a much improved machine is made, and one which will do approximately thirty per cent. more work in a given time, with less effort by the operator.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a machine of the character described, the combination of a frame, two laterally contacting relatively slidable plates held therein, said plates having spaced shoulders and complementary mold recesses in their adjacent faces; and fluid-pressure operated means coöperative with such shoulders but disconnected therefrom, said means being adapted to press said plates in opposite directions.

2. In a machine of the character described, the combination of a frame, two laterally contacting complementary mold plates disposed therein, and a fluid pressure operated flexible tube adapted to move one of said plates relative to said other plate, and in a direction parallel to the plane of contact of said plates.

3. In a machine of the character described, the combination of a frame, two laterally contacting complementary mold plates disposed therein, each of said plates being provided with a projecting shoulder spaced from such shoulder on said other plate, and fluid-pressure means disposed between such shoulders and adapted to force said mold plates in opposite directions.

4. In a machine of the character described, the combination of a frame, two laterally contacting complementary mold plates disposed therein, each of said plates being provided with an engaging face, such two faces being spaced from each other, and fluid pressure means disposed between such faces and adapted to force said mold plates in opposite directions.

5. In a machine of the character described, the combination of a frame, two complementary mold plates, each of said plates being provided with a projecting shoulder spaced from such shoulder on said other plate, and a fluid-pressure operated flexible tube disposed between such spaced shoulders and adapted to press said mold plates in opposite directions.

6. In a machine of the character described, the combination of a frame, two complementary mold plates, one of said plates being provided with two spaced lugs and the other of said plates being provided with a single lug disposed intermediately of such two lugs, and two fluid-pressure operated expanding members, disposed one on either side of such intermediate lug and between the same and such other two lugs, whereby alternate operation of such members causes alternate reciprocation of said two mold plates.

7. In a machine of the character described, the combination of a frame, two complementary mold plates, one of said plates being provided with two spaced lugs and the other of said plates being provided with a single lug disposed intermediately of such two lugs, two flexible tubes, disposed in a flattened condition, on either side of such intermediate lug and between the same and such other two lugs, and means controlling the entrance of fluid-pressure into said tubes alternately, thereby causing alternate reciprocation of said mold plates.

8. In a machine of the character described, the combination of a frame, two complementary mold plates, one of said plates being provided with two spaced lugs and the other of said plates being provided with a single lug disposed intermediately of such two lugs, two flexible tubes disposed in a flattened condition, on either side of such intermediate lug and between the same and such other two lugs, and a valve member connected to said two tubes and adapted upon actuation to permit the entrance of fluid-pressure into said two tubes alternately, thereby causing alternate reciprocation of said mold plates.

9. In a machine of the character described, the combination of a frame, two complementary mold plates, one of said plates being provided with two spaced lugs and the other of said plates being provided with a single lug disposed intermediately of such two lugs, two flexible tubes, disposed in a flattened condition, on either side of such intermediate lug and between the same and such other two lugs, and two valve members, each connected to adjacent ends of said tubes, one of said valves being adapted to permit the entrance of fluid-pressure into said two tubes alternately and the other being adapted to permit the discharge of the fluid-pressure from said tubes alternately, thereby causing alternate reciprocation of said mold members.

10. In a machine of the character described, the combination of a frame, two complementary mold plates, one of said plates being provided with two spaced lugs and the other of said plates being provided with a single lug disposed intermediately of such two lugs, two flexible tubes, disposed in a flattened condition, on either side of such intermediate lug and between the same and such other two lugs, two valve members, each connected to adjacent ends of said tubes, one of said valves being adapted to permit the entrance of fluid-pressure into said tubes alternately, and the other being adapted to permit the discharge of the fluid-pressure from said tubes alternately, and means connecting said tubes and adapted to simultaneously operate them to cause said tubes to be alternately expanded, thereby alternately reciprocating said mold plates.

11. In a machine of the character described, the combination of a frame, two complementary mold plates, one of said plates being provided with two spaced lugs and the other of said plates being provided with a single lug disposed intermediately of such two lugs, two flexible tubes, disposed in a flattened condition, on either side of such intermediate lug and between the same and such other two lugs, a valve casing having three apertures therein, one of said apertures being connected to a source of fluid-pressure, said two tubes being connected to such other two apertures, and a stopper in said casing, said stopper being provided with a passage adapted to connect one of said tubes and such aperture leading to the fluid-pressure supply.

12. In a machine of the character described, the combination of a frame, two mold plates reciprocably held therein, means for alternately reciprocating said plates, and for temporarily holding stationary the plate which is not reciprocated, and other means adapted to jar such stationary plate upon reciprocation of the other plate; said means including a lug upon each of said plates, and a member actuated by the lug on such other plate adapted to engage the lug on such stationary plate during reciprocation of such other plate.

13. In a machine of the character described, the combination of a frame, two mold plates reciprocably held therein, a slotted lug mounted on one of said plates, an apertured lug mounted on said other plate, such aperture being substantially circular and adapted to register with the central portion of such slot in the normal position of said plates, and a rod held in such aperture and extending into such slot, and means for alternately reciprocating said plates, the extent of such reciprocation being limited by the striking of said rod against the sides of said slot, thereby jarring the stationary one of such two plates.

Signed by me this 26th day of April, 1912.

CHRISTIAN A. RITTMAN.

Attested by—
 HORACE D. FAY,
 ANNA L. GILL.

---

Copies of this patent may be obtained for five cents each, by addressing the "Commissioner of Patents, Washington, D. C."